(12) United States Patent
Geliot et al.

(10) Patent No.: US 12,370,390 B2
(45) Date of Patent: Jul. 29, 2025

(54) ASSEMBLY OF AT LEAST ONE EXTINGUISHING AGENT TANK IN THE INTERIOR OF AN AIRCRAFT STRUT

(71) Applicant: Airbus Operations SAS, Toulouse (FR)

(72) Inventors: Jean Geliot, Toulouse (FR); Adeline Soulie, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 380 days.

(21) Appl. No.: 18/158,099

(22) Filed: Jan. 23, 2023

(65) Prior Publication Data

US 2023/0233892 A1   Jul. 27, 2023

(30) Foreign Application Priority Data

Jan. 25, 2022   (FR) ...................................... 2200633

(51) Int. Cl.
*A62C 3/08* (2006.01)
*A62C 35/02* (2006.01)
*B64D 27/40* (2024.01)

(52) U.S. Cl.
CPC ................ *A62C 3/08* (2013.01); *A62C 35/02* (2013.01); *B64D 27/40* (2024.01)

(58) Field of Classification Search
CPC ......... A62C 13/78; A62C 35/13; A62C 35/02; A62C 35/08; B64D 29/02; B64D 2045/009; B64D 37/02; B64D 37/32; B64D 27/40; F17C 2270/0189
See application file for complete search history.

(56) References Cited

U.S. PATENT DOCUMENTS

| | | | |
|---|---|---|---|
| 2010/0230122 A1* | 9/2010 | Machado | ................. A62C 3/08 169/62 |
| 2020/0231294 A1 | 7/2020 | Martinel et al. | |
| 2021/0101694 A1* | 4/2021 | Cayssials | ............... B64D 37/32 |

FOREIGN PATENT DOCUMENTS

| | | |
|---|---|---|
| CN | 211584982 U | 9/2020 |
| WO | 2013131640 A2 | 9/2013 |

OTHER PUBLICATIONS

French Search Report dated Aug. 3, 2022; priority document.

* cited by examiner

*Primary Examiner* — Christopher R Dandridge
(74) *Attorney, Agent, or Firm* — Greer, Burns & Crain, Ltd.

(57) ABSTRACT

An assembly of at least one extinguishing agent tank in the interior of an aircraft strut. The strut has an elongate chamber form extending in a longitudinal direction and includes a plurality of ribs which are spaced apart and arranged in parallel along the strut, each extending orthogonally to the longitudinal direction. The ribs are covered by lateral walls, at least one of the walls comprising a window opening into a space between two consecutive ribs, and via which a spherical extinguishing agent tank is installed in the interior of the strut. The assembly of the tank on the strut includes a frame arranged in the interior of the strut, facing the window and secured on each of the two consecutive ribs. The frame forms a support area on which the tank is supported. A system locks the extinguishing agent tank on the frame.

8 Claims, 6 Drawing Sheets

ASSEMBLY OF AT LEAST ONE EXTINGUISHING AGENT TANK IN THE INTERIOR OF AN AIRCRAFT STRUT

CROSS-REFERENCES TO RELATED APPLICATIONS

This application claims the benefit of the French patent application No. 2200633 filed on Jan. 25, 2022, the entire disclosures of which are incorporated herein by way of reference.

FIELD OF THE INVENTION

The present invention concerns an assembly of at least one extinguishing agent tank in the interior of an aircraft strut.

BACKGROUND OF THE INVENTION

Below each of its wings, an aircraft conventionally comprises a turbine engine which is secured on the wing by means of a strut. The strut is in the form of a chamber comprising an inner structure covered with walls, wherein the inner structure is formed by a plurality of ribs which are spaced from one another, and all extend orthogonally relative to the longitudinal direction of the chamber.

In order to extinguish a fire which may break out in the turbine engine, extinguishing agent tanks are installed in the strut.

Figure 1:
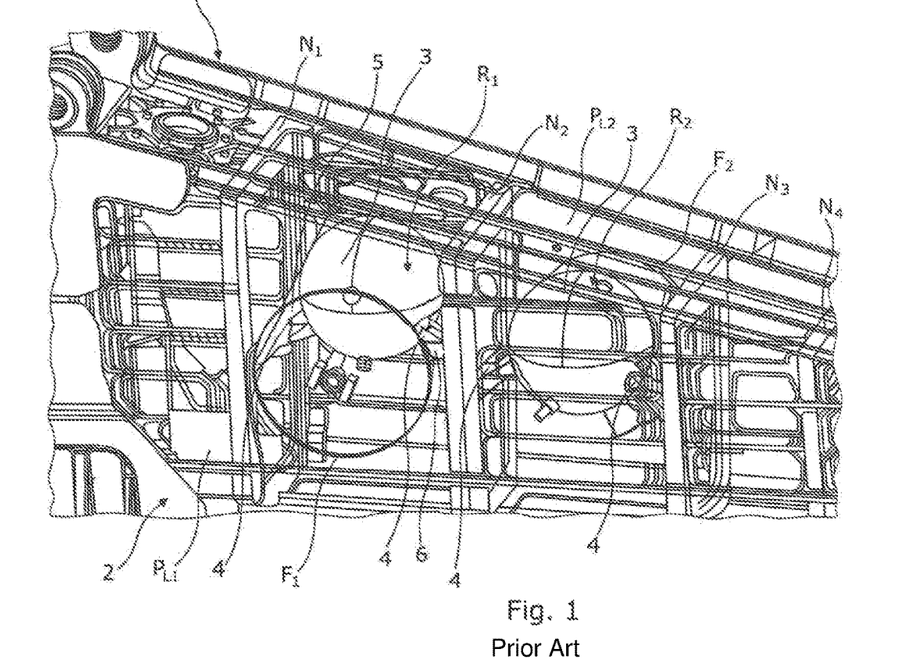
FIG. 1, already described, is a view in perspective of a strut in which two extinguishing agent tanks according to the prior art are installed.

FIG. 1 shows a strut 2 according to the prior art in which two tanks R1, R2 are installed. Each extinguishing agent tank R1, R2 comprises a spherical vessel 3, on which there are welded four fastening lugs 4 which project towards the exterior of the vessel 3. For each extinguishing agent tank R1, R2, the strut 2 has a window F1, F2 which passes through a lateral wall P1 of the strut, and opens into the space between two consecutive ribs N1-N3, and via which the extinguishing agent tank R1, R2 is introduced into, and secured in, the interior of the strut 2. In an identical manner for each of the tanks R1, R2, two fastening lugs 4 which are integral with the vessel 3 are designed to be secured by screwing on an angle iron 5 which is integral with a first rib, and, in the same manner, two other fastening lugs 4 which are integral with the vessel 3 are designed to be secured by screwing on another angle iron 6 which is integral with a second rib, consecutive with the first rib.

The dimensions of the window F1, F2 are increased in order to allow the operator to introduce his hands, so as to secure the extinguishing agent tank R1, R2.

At present, new extinguishing agents may be used, which require larger storage volumes. As a result, the dimensions of the vessels of the extinguishing agent tanks must be increased. The installation of these new extinguishing agent tanks in the strut would thus require windows with larger dimensions, which could weaken the structure of the strut.

It is therefore necessary to find a solution which permits introduction of extinguishing agent tanks with a larger volume into the strut, without needing to increase the dimensions of the windows.

SUMMARY OF THE INVENTION

An objective of the invention is to fulfil this need entirely or partly, and concerns an assembly of at least one extinguishing agent tank in the interior of an aircraft strut, the strut having an elongate chamber form extending in a longitudinal direction and comprising a plurality of ribs which are spaced from one another and arranged in parallel along the strut, each extending orthogonally to the longitudinal direction, the ribs being covered by lateral walls, at least one of the walls comprising a window opening into a space between two consecutive ribs, and via which an extinguishing agent tank comprising a vessel with a substantially spherical form is installed in the interior of the strut, the assembly of the at least one tank on the strut comprising:

a frame which is arranged in the interior of the strut, facing the window and secured on each of the two consecutive ribs, the frame forming a support area on which the tank is supported; and a system for locking the extinguishing agent tank on the frame.

BRIEF DESCRIPTION OF THE DRAWINGS

The aforementioned characteristics of the invention, as well as others, will become more clearly apparent from reading the following description of an embodiment, the description being provided in relation with the appended drawings, in which.

DETAILED DESCRIPTION OF THE PREFERRED EMBODIMENTS

Figure 2:
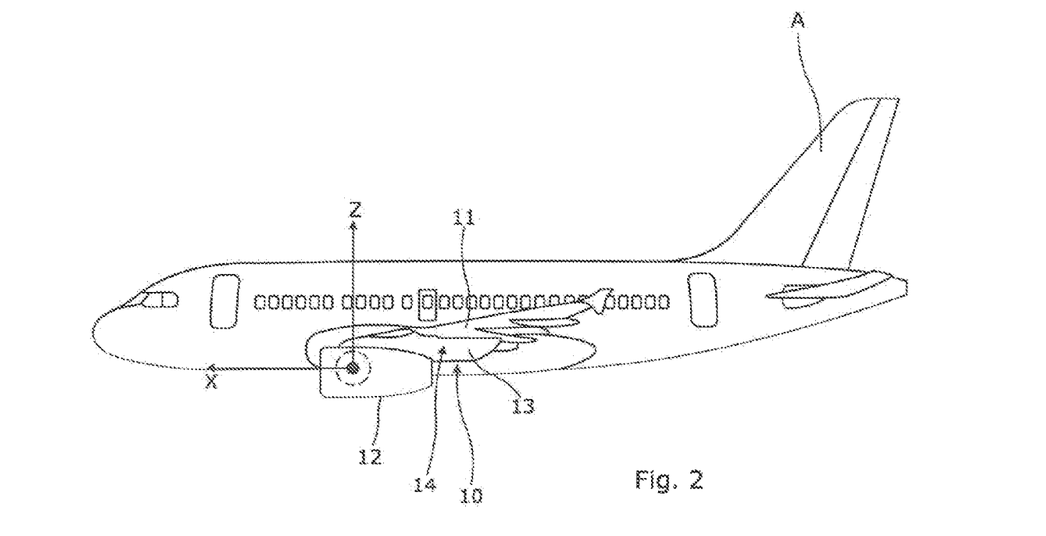
FIG. 2 is a view from the side of an aircraft comprising a strut in which an extinguishing agent tank according to an embodiment of the invention is installed.

In relation to FIGS. 2 and 3, an aircraft A comprises a turbine engine 12 which is secured below the wing of the aircraft A by means of a strut 13.

In the following description, and by convention, the longitudinal of the aircraft is known as X, the transverse direction which is horizontal when the aircraft is on the ground is known as Y, and Z is the vertical direction which is vertical when the aircraft is on the ground, these three directions X, Y and Z being orthogonal to one another.

The strut 13 comprises an extinguishing agent tank R, which is secured removably in the interior of the strut 13, and is designed to be connected to the turbine engine 12 via discharge piping (not represented).

The strut 13 extends conventionally, longitudinally, in a longitudinal direction X, and is in the form of an elongate chamber comprising an inner structure covered with walls, including two lateral walls, in particular a lateral port wall PLB and a lateral starboard wall PLT. The inner structure of the strut is formed by a plurality of ribs N1, N2, which are spaced from one another, and are arranged in parallel along the strut, where each rib extends orthogonally to the longitudinal direction X.

A lateral wall, in this case a port wall PLB, is pierced by a window 15 with a circular form, which makes it possible to access the interior of the strut 13, and opens into a space situated between two consecutive ribs N1, N2. The extinguishing agent tank R is in particular introduced into, and installed in, the strut 13, through the window 15.

Figure 4A:
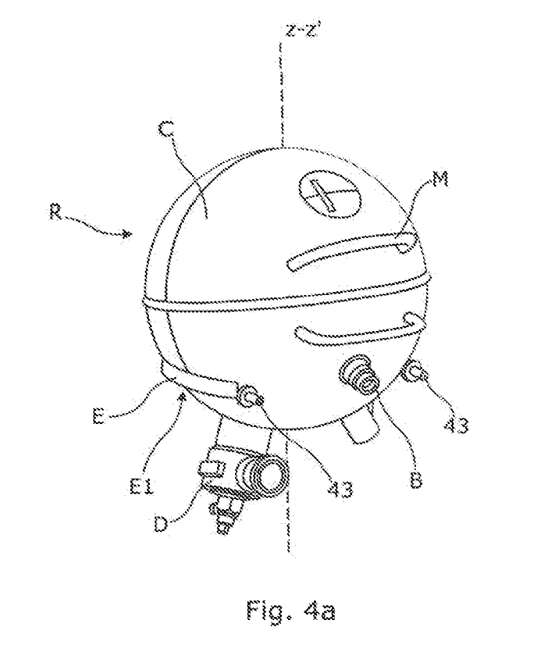
FIG. 4a is a view in perspective of the extinguishing agent tank represented in FIG. 3, according to a first viewing angle.
Figure 4B:
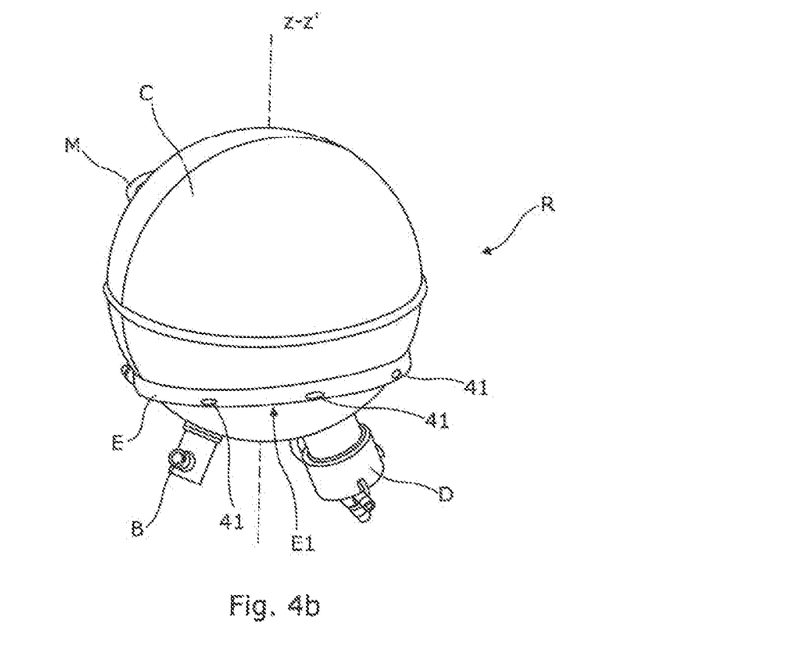
FIG. 4b, similar to FIG. 4a, is a view in perspective of the extinguishing agent tank represented in FIG. 3, according to a second viewing angle.

The extinguishing agent tank R, which is more particularly represented in FIGS. 4a and 4b, comprises a vessel C which is designed to receive an extinguishing agent under pressure. A discharge head D which is fitted on the vessel C permits discharge of the extinguishing agent from the vessel C.

The vessel C has a form with symmetry of revolution according to a vertical axis Z-Z', known as the central axis, which extends in a direction in common with the vertical direction Z, when the extinguishing agent tank R is installed in the strut 13. In the example of the figures, the vessel C has a spherical form.

According to the invention, the assembly of the extinguishing agent tank R in the interior of the strut 13 comprises:
  a frame 20 which is situated in the interior of the strut 13, facing the window 15, and is secured, for example by welding or screwing, on each of the two consecutive ribs N1, N2, and forming a support area AP for the extinguishing agent tank R;
  a system 40 for locking the extinguishing agent tank R on the frame 20, thus permitting unlocking or locking of the extinguishing agent tank relative to the frame 20, in order therefore to make the extinguishing agent tank R go from an unlocked position, in which the extinguishing agent tank R is added onto the frame 20, and is supported freely on the support area AP, to a locked position, in which the extinguishing agent tank R is added onto the frame 20, and is supported on the support area AP, while being mechanically connected to the frame, in order to prevent free separation of the tank from the frame 20, and conversely.

Figure 5:
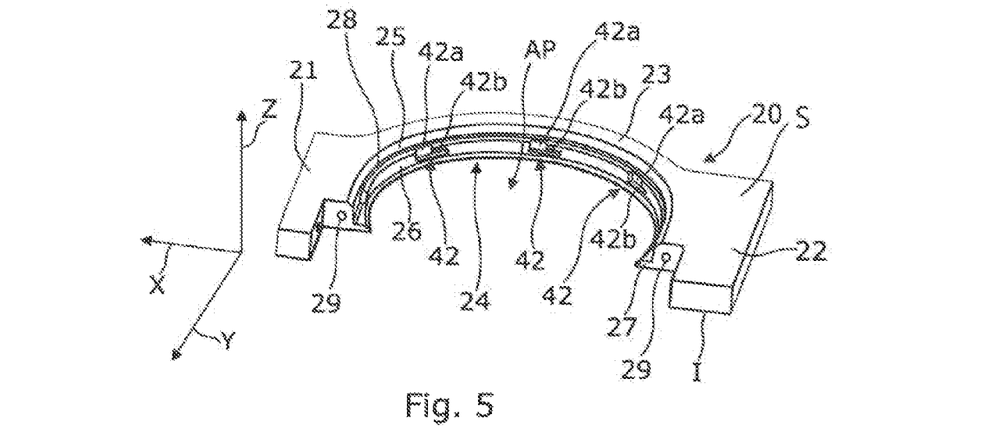
FIG. 5 is a view in perspective of the frame represented in FIG. 3.

In the embodiment which is represented in the figures, and is shown in particular in [FIG. 5], the frame 20 is a plate which extends perpendicularly to the ribs N1, N2, and has a general form of a "U" open towards the window 15. The frame 20 extends parallel to the horizontal when the aircraft A is on the ground.

The frame 20, which is formed by machining, comprises two arms 21, 22 extending parallel to one another and joined by an annular portion 23 with a curved form. The frame 20 is secured on the two ribs N1, N2 of the strut 13 at its arms 21, 22. More specifically, each of the arms 21, 22 is secured on a rib N1, N2, and extends towards the lateral wall PLB pierced with the window, parallel to the horizontal, when the aircraft A is on the ground, and in the transverse direction Y.

The space defined between the two arms 21, 22 and the annular portion 23 forms the support area AP for the extinguishing agent tank R, making it possible to place the tank on the frame 20 in a fitting position. The annular portion 23 extends over more than 180°, and comprises an inner rim 24 with a smooth face 26 having a form complementary to that of the extinguishing agent tank R.

Figure 6:
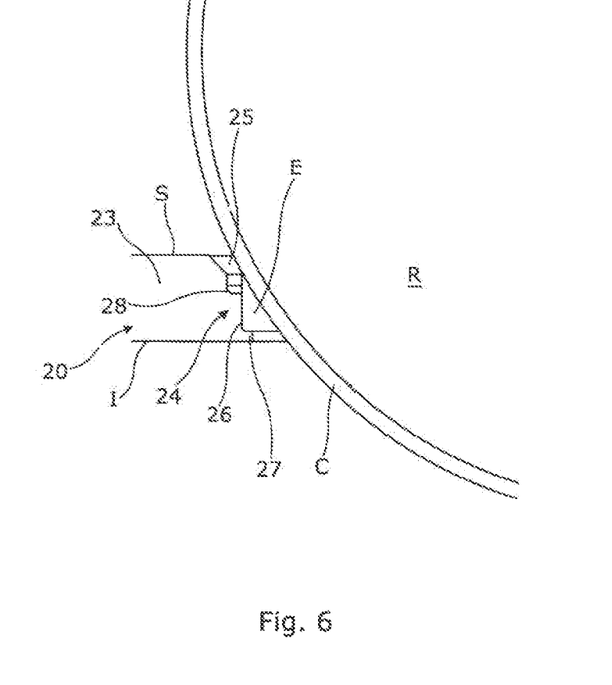
FIG. 6 is a view in cross-section according to A-A of FIG. 3, enlarged in order to show a detail of the frame.

Shown more particularly in FIG. 6, the annular portion 23 comprises:
  at the upper face S of the frame 20, an interior chamfer 25 which opens onto the smooth face 26 in order to facilitate the insertion of the extinguishing agent tank R into the support area AP; and
  at the lower face I of the frame 20, a collar 27 which extends the smooth face 26.

The extinguishing agent tank R for its part is provided with a skirt E, arranged on the exterior of the vessel C. The skirt E extends on a plane orthogonal to the central axis Z-Z', on only part of the vessel C. The skirt E comprises a flat wall E1, parallel to a plane orthogonal to the central axis Z-Z', and defining a shoulder which is designed to be supported against the collar 27 of the frame, when the extinguishing agent tank R is supported on the frame 20. In cooperation with the inner rim 24 of the frame 20, the skirt E thus makes it possible to ensure self-centering of the extinguishing agent tank R relative to the frame 20.

In the example illustrated in the figures, the locking system 40 is of the bayonet type, and the locking or unlocking of the extinguishing agent tank relative to the frame 20 takes place by pivoting of the extinguishing agent tank R relative to the frame 20 according to its central axis Z-Z', and according to a predetermined direction.

For this purpose, the locking system 40 comprises protuberances 41 arranged on the vessel C, which are designed to ensure the locking and unlocking of the extinguishing agent tank R relative to the frame 20, in order to engage and disengage respectively mutually by rotation of the extinguishing agent tank R relative to the frame 20 around the central axis Z-Z', according to a predetermined angular course and a predetermined direction, in locking ramps 42 provided along the annular portion 23 of the frame 20.

The invention is not limited to a particular configuration of the protuberances 41 or of the locking ramps 42 of the bayonet locking system 40, the essential thing being that the protuberances and ramps cooperate together by rotation of the extinguishing agent tank R relative to the frame 20, in this case along the central axis Z-Z', in order for the protuberances 41 to engage in the locking ramps 42, so as to provide a mechanical connection between the extinguishing agent tank R and the frame 20.

In the embodiment represented, the protuberances 41 are formed by three studs arranged at regular intervals along the skirt E, and each stud is designed to engage in a locking ramp 42. Each locking ramp 42 is formed by machining of the interior rim 24 of the frame 20 at its smooth face 26, such as to form two grooves, with:
  a first groove 42a with an oblong form, extending substantially in the vertical direction Z, and opening towards the upper face S of the frame 20, in order to form an input/output for the engagement/disengagement of a protuberance 41;
  a second groove 42b with an oblong form, communicating with the first groove 42a and extending transversely thereto, thus permitting the rotation of the extinguishing agent tank R relative to the frame 20 according to the axis Z-Z', when the protuberance 41 is engaged in the first groove 42a, and abuts the base of the first groove 42a.

The clockwise/anticlockwise orientation of the second groove 42b determines the direction of rotation to be applied to the extinguishing agent tank R relative to the frame 20, in order to lock/unlock it relative to the frame 20. The dimension of the second groove 42b for its part determines the angular course of the aforementioned rotation.

It will be noted that the positioning of the protuberances 41 is determined such that the skirt E of the tank comes into contact with the collar 27 of the frame 20 only when all the protuberances 41 abut the base of the first groove 42a of their associated locking ramp 42.

Preferably, and as illustrated in FIG. 6, the interior rim 24 of the annular portion 23 of the frame 20 is machined, and comprises an annular clearance 28 which joins the interior chamfer 25 to the smooth face 26. The first grooves 42a of the locking ramps 42 all open onto the annular clearance 28. This clearance forms a support path for the protuberances 41, in order to guide the operator in the handling of the extinguishing agent tank R, for the purpose of engaging the protuberances 41 in the locking ramps 42.

Figure 3:
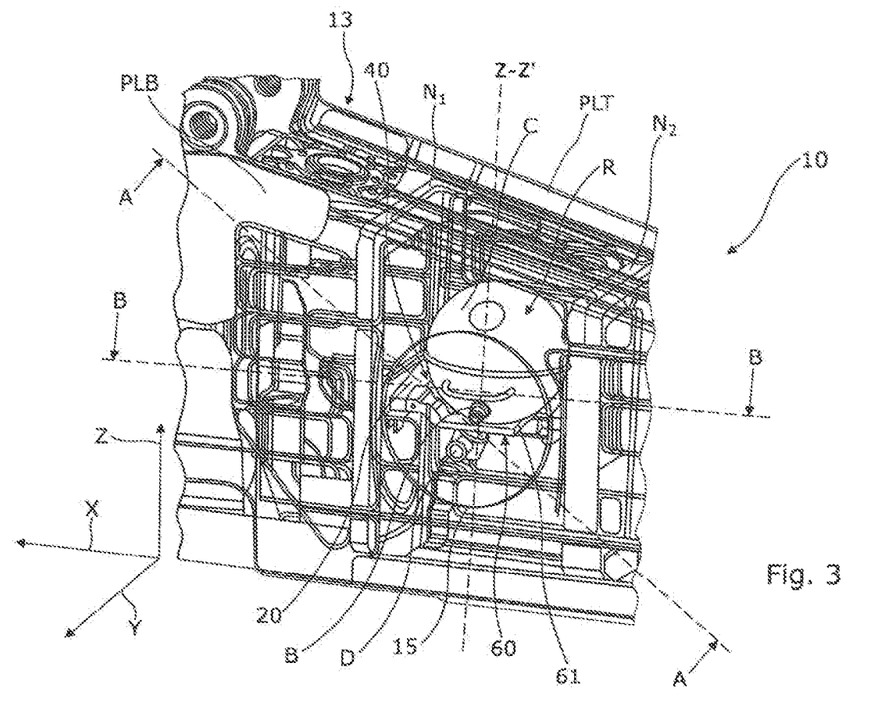
FIG. 3 is a partial view in perspective of a strut represented in FIG. 2, illustrating the extinguishing agent tank assembly in the interior of the strut according to an embodiment of the invention.

Preferably, and as illustrated in FIG. 3, the assembly of the extinguishing agent tank on the strut 13 comprises a system 60 for flanging of the tank R on the frame 20 which comprises a flange 61 secured on the frame 20.

The flanging system 60 is configured, by flanging of the extinguishing agent tank R on the frame 20 by means of the flange 61 secured on the frame 20, to prevent any unintentional rotation of the extinguishing agent tank R relative to the frame 20.

For this purpose, the flange 61 is provided with receptacles 62 which are designed to receive appendices 43 arranged on the vessel C of the extinguishing agent tank R. In its position of use, the flange 61 is secured on the frame 20 by securing means (not represented in the figures), for example of the screw type.

Figure 7:
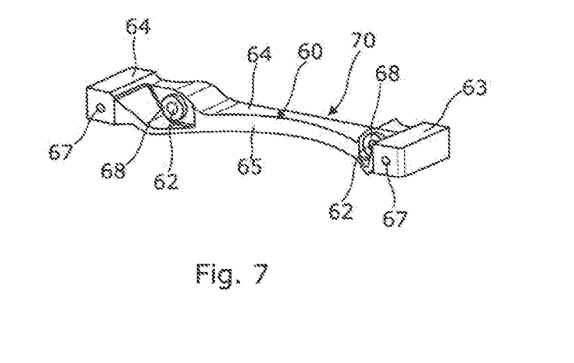
FIG. 7 is a view in perspective of the flange represented in FIG. 3.

In the embodiment illustrated in the figures, and more particularly with reference to FIG. 7, the flange 61 is obtained by machining, and has a form in the shape of a "U" with two arms 63, 64 extending parallel to one another, and joined by an intermediate portion 65 with a curved form. The intermediate portion 65 has a smooth interior rim 66.

Figure 8:
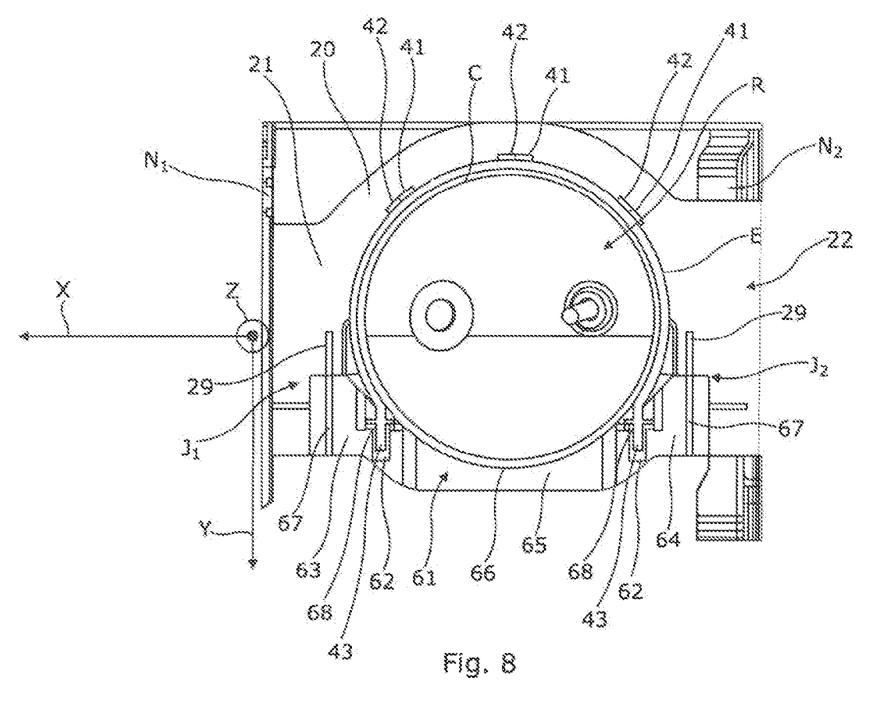
FIG. 8 is a view in cross-section according to B-B of FIG. 3, enlarged in order to show details of the frame and the flange.

As represented in the figures, and in particular FIG. 8, when the flange 61 is secured on the frame 20 and encloses the extinguishing agent tank R, a first arm 63 of the flange extends a first arm 21 of the frame, a second arm 64 of the flange extends a second arm 22 of the frame, and the interior rim 66 of the flange 61 extends the interior rim 24 of the frame 20.

The flange 61 and the frame 20 are connected in two overlapping areas J1, J2 by means of screws (not represented in the figures), where the overlapping areas are situated on both sides of the intermediate portion 65 of the flange 61/of the annular portion 23 of the frame 20.

In each of the overlapping areas J1, J2, the frame 20 and the flange 61 comprise a stepped junction composed of profiles which interpenetrate in the form of a setback.

In particular, on the frame 20 side, the profiles are arranged on the ends of the arms 21, 22, which are situated facing the window 15.

In an identical manner in each of the areas of overlapping J1, J2, the flange 61 is secured on the frame 20 by a screw which is inserted in a transverse direction Y, and passes through the length of an orifice 67 provided in an arm 63, 64 of the flange 61. The screw is screwed into a threaded orifice 29 of the frame 20. Each stepped junction makes it possible to absorb the shearing forces which act on the flange 61 and the frame 20 during the tightening of the screws onto the plate 20.

The invention is not limited to a particular configuration of the receptacles 62 or of the appendices 43, the essential thing being that these elements cooperate together in order to prevent any rotation of the extinguishing agent tank R relative to the frame 20, in this case along its central axis Z-Z', when the flange 61 is secured on the frame 20, and encloses the extinguishing agent tank R by engagement of the appendices 43 in the receptacles 62, in order to provide a mechanical connection between the extinguishing agent tank R and the flange 61.

In the embodiment represented, the flange 61 comprises two receptacles 62 in the form of orifices, and the appendices 43 are spindles which are designed to be inserted in the orifices.

The receptacles 62 are arranged on the interior rim 66 of the intermediate portion 65 of the flange 61, with a receptacle 62 at each end of the intermediate portion 65. In other words, there is a receptacle 62 at the junction between the intermediate portion 65 and a first arm 63, and another receptacle 62 at the junction between the intermediate portion 65 and a second arm 64.

The two appendices 43 extend in parallel to one another, and are positioned on the vessel C such that each of the appendices 43 can be inserted in a receptacle 62, when the extinguishing agent tank R is locked relative to the frame 20. In the embodiment illustrated in the figures, the appendices 43 are situated at the two free ends of the skirt E, with an appendix 43 arranged on each of the free ends of the skirt E.

As represented in FIG. 7, each of the receptacles 62 is arranged in a clearance arranged on the interior rim 66 of the intermediate portion 65 of the flange, such as to facilitate the insertion of the appendices 43 in the receptacles 62.

Preferably, an elastomer sleeve 68 is arranged in each of the clearances, in order to absorb the differences of positioning of the appendices 43 and of the flange 61, and to create stress on the extinguishing agent tank R at the moment of clamping of the flange 61 onto the frame 20.

It will be noted that in the figures, in particular FIG. 7, the intermediate portion 65 of the flange 61 has a cut-out 70 for the passage of a filling nozzle B of the tank, which is situated facing the window 15 when the extinguishing agent tank R is locked onto the frame 20.

Preferably, in order to facilitate the handling of the extinguishing agent tank R, the tank comprises at least one handle M, which is secured on the vessel C such as to project on the exterior thereof. When the extinguishing agent tank R is installed in the frame 20, in the locked position, the handle M is situating facing the window 15, such as to be easily accessible to an operator.

Putting the extinguishing agent tank R into place in the strut 13 consists of introducing the tank through the window 15 in a transverse direction Y, until the tank is placed on the support area AP of the frame 20. The extinguishing agent tank R is then handled, making it turn according to its central vertical axis Z-Z, in order to align the protuberances 41 on the first grooves 42a of the locking ramps 42 which are associated with them. Once the alignment has been carried out, and under its weight, the extinguishing agent tank R is displaced downwards in a vertical direction Z, and the protuberances 41 abut the base of the first grooves 42a. The extinguishing agent tank R is then in an unlocked configuration.

The operator applies rotation to the extinguishing agent tank R according to its central vertical axis Z-Z', in the direction of locking, which gives rise to translation of each protuberance 41 in the second groove 42b of the associated locking ramp 42, until the protuberance 61 touches the base of the second groove 42b. The extinguishing agent tank R is then in a locked configuration thus assured by the receptacle, or in other words the trapping of each of its protuberances 61 in the locking ramp 42 which is associated with it.

The operator then secures the flange 61 on the frame 20 by screwing, after having inserted the appendices 43 in the receptacle 62 of the flange 61 associated with them.

Once the flange 61 is secured on the frame 20 by screwing, the extinguishing agent tank R is in the operational configuration, i.e., locked and blocked in rotation.

The extinguishing agent tank R is dismantled by implementation of the inverse operations.

The use of a bayonet locking system 40 in order to assemble the extinguishing agent tank R in the strut 13 makes it possible to dispense with the welded lugs. Each of such welded lugs conventionally extends towards the exterior of the vessel C by a distance of approximately ten centimeters, for a vessel with a capacity of 20 L. On the contrary, according to the invention, the protuberances 61 and the appendices 43 project from the vessel C by only 1 to 2 cm, irrespective of the volume of the vessel. The volume of the vessel C, which is no longer constrained by the presence of the welded lugs, can thus be increased without needing to increase the diameter of the window.

In the embodiment of the invention described above, a single extinguishing agent tank R is arranged in the strut 13, but there are preferably at least two extinguishing agent tanks arranged in the strut 13. The invention then applies in the same manner to each extinguishing agent tank, and, in this case, there is, for example, a window in each lateral wall of the strut 13, i.e., a window pierced in the port lateral wall and a window pierced in the starboard lateral wall, and each extinguishing agent tank is designed to be introduced through a window, one at the port side and the other at the starboard side, and the assembly of each extinguishing agent tank with the strut is as described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly of at least one extinguishing agent tank in the interior of an aircraft strut, the strut having an elongate chamber form extending in a longitudinal direction and comprising a plurality of ribs which are spaced from one another and arranged in parallel along the strut, each extending orthogonally to the longitudinal direction, the ribs being covered by lateral walls, at least one of the walls comprising a window opening into a space between two consecutive ribs, and via which an extinguishing agent tank comprising a vessel with a substantially spherical form is installed in the interior of the strut, wherein the assembly of the at least one tank on the strut comprises:
   a frame which is arranged in the interior of the strut, facing the window and secured on each of the two consecutive ribs, the frame forming a support area on which the tank is supported; and
   a system for locking the tank on the frame.

2. The assembly according to claim 1,
   wherein the system for locking comprises protuberances arranged on the extinguishing agent tank and locking ramps arranged on the frame, and
   wherein the protuberances are engaged in the locking ramps.

3. The assembly according to claim 2,
   wherein the frame is formed as a "U" which is open towards the window and comprises two arms extending parallel to one another, and each towards the wall comprising a window, and an annular portion with a curved form joining the two arms, and comprising an interior rim with a form complementary to that of the extinguishing agent tank, and with which the tank is in contact, and
   wherein the locking ramps are arranged on the annular portion.

4. The assembly according to claim 3, wherein the extinguishing agent tank comprises a skirt which is secured on the vessel, and along which the protuberances are arranged.

5. The assembly according to claim 4, wherein the interior rim of the frame comprises a collar on which the skirt is supported.

6. The assembly according to claim 1, further comprising a system for flanging the extinguishing agent tank on the frame, the system for flanging comprising a flange which is secured on the frame.

7. The assembly according to claim 6,
   wherein the system for flanging comprises receptacles arranged on the flange, and appendices arranged on the extinguishing agent tank, and
   wherein the appendices are received in the receptacles.

8. The assembly according to claim 7,
   wherein the flange is formed as a "U" with two arms extending parallel to one another and joined by an intermediate portion, the intermediate portion having an interior rim with a curved form complementary to that of the extinguishing agent tank, and with which the tank is in contact,
   wherein a first arm of the flange extends a first arm of the frame, a second arm of the flange extends a second arm of the frame, and
   wherein the interior rim of the flange extends the interior rim of the frame.

* * * * *